United States Patent [19]

Akaiwa et al.

[11] Patent Number: 5,710,995
[45] Date of Patent: Jan. 20, 1998

[54] ADAPTIVE ANTENNA RECEIVER

[75] Inventors: Yoshihiko Akaiwa, Munakata; Mitsunori Morishima; Shunji Miyahara, both of Yokohama, all of Japan

[73] Assignee: Ford Motor Company, Dearborn, Mich.

[21] Appl. No.: 782,187

[22] Filed: Jan. 16, 1997

[51] Int. Cl.$^6$ .................................................. H04B 1/06
[52] U.S. Cl. ........................... 455/277.2; 455/276.1; 455/275; 455/272; 455/137; 455/134; 455/135; 455/65; 455/506; 375/347; 381/13
[58] Field of Search .......................... 455/500, 501, 455/504, 506, 63, 65, 67.1, 67.6, 67.3, 101, 132, 133, 134, 135, 136, 137, 138, 139, 269, 272, 273, 275, 276.1, 277.1, 277.2, 278.1, 296, 280; 375/347, 349; 381/13

[56] References Cited

U.S. PATENT DOCUMENTS

| | | | |
|---|---|---|---|
| 4,035,728 | 7/1977 | Ishikawa et al. | 455/132 |
| 4,939,791 | 7/1990 | Bochmann et al. | 455/137 |
| 5,203,027 | 4/1993 | Nounin et al. | 375/347 |
| 5,335,010 | 8/1994 | Lindemeier et al. | 455/277.1 |
| 5,408,685 | 4/1995 | Kennedy et al. | 381/13 |
| 5,425,059 | 6/1995 | Tsjuimoto . | |
| 5,473,333 | 12/1995 | Chiba et al. . | |
| 5,515,378 | 5/1996 | Roy, III et al. . | |
| 5,535,440 | 7/1996 | Clappier | 455/277.2 |
| 5,621,769 | 4/1997 | Wan et al. | 455/133 |

*Primary Examiner*—Reinhard J. Eisenzopf
*Assistant Examiner*—Doris To
*Attorney, Agent, or Firm*—Mark Mollon

[57] ABSTRACT

An FM radio receiver, particularly for mobile receivers, reduces the effects of multipath distortion. It selects either an adaptive process (constant modulus algorithm or CMA) or a antenna diversity process depending on the circumstances of the instantaneous reception. The receiver reduces both the decline of the level of received signals with the diversity process and waveform distortion with the CMA process.

11 Claims, 2 Drawing Sheets

ADAPTIVE ANTENNA RECEIVER

BACKGROUND OF THE INVENTION

The present invention relates in general to a receiver for receiving FM broadcast signals using multiple antennas, and more specifically to a receiver for providing optimized signal reception of broadcast signals in the presence of multipath distortion.

The problem of multipath distortion in radio receivers is well known. It occurs when radio frequency (RF) signals following direct and indirect or reflected paths from a transmitter to a receiver interfere with each other at the receiver antenna. Reflections are caused by hills and buildings, for example.

Constructive and destructive interference of signals caused by interaction between the reflections and the direct propagation path causes both rapid fluctuations in the received field intensity and waveform distortion. More specifically, signal-to-noise power ratio is reduced when multiple signals cancel each other at the receiving antennas thereby lowering the received signal level. Also, signal waveform distortion becomes significant when the arrival times between different signals traversing different signal paths become significant. Each of these problems is aggravated in moving vehicles since the multipath conditions for a mobile receiver are constantly changing.

One solution to the first problem is known as diversity reception which uses a plurality of spaced antennas and selects the antenna signal with the highest signal-to-noise power ratio or field intensity. The second problem can be addressed using an adaptive equalizer forming a corrected signal from multiple antenna signals. In mobile communications, however, the first problem and the second problem take place in an irregular manner because the radio propagation environment differs greatly depending on the instantaneous position of the antennas. The amount of each type of distortion and the signal-to-noise ratio continuously vary independently of one another. Therefore, prior art mobile receivers have failed to optimize reception under multipath conditions.

SUMMARY OF THE INVENTION

The present invention has the advantage of effectively solving both types of distortion problems resulting from multipath simultaneously to optimize quality of the received signal. The above problems are solved by combining diversity reception with an adaptive equalizer in a radio receiver using simple circuits which automatically adjust for a lowered level of signals and waveform distortion.

In one aspect of the invention, a radio receiver is adapted to be coupled to at least two spaced-apart receiving antennas generating antenna signals in response to radio broadcast signals. A correction circuit receives the antenna signals and synthesizes a corrected signal as a weighted combination of the antenna signals. A diversity selecting circuit receives the antenna signals and generates a diversity signal corresponding to a selection of a best one of the antenna signals according to a diversity criterion. A signal quality monitor circuit is coupled to the correction circuit and the diversity selecting circuit for measuring a predetermined quality of the corrected signal and the diversity signal. A selection circuit outputs either the corrected signal or the diversity signal in response to the measured predetermined quality.

DETAILED DESCRIPTION OF PREFERRED EMBODIMENTS

Figure 1:
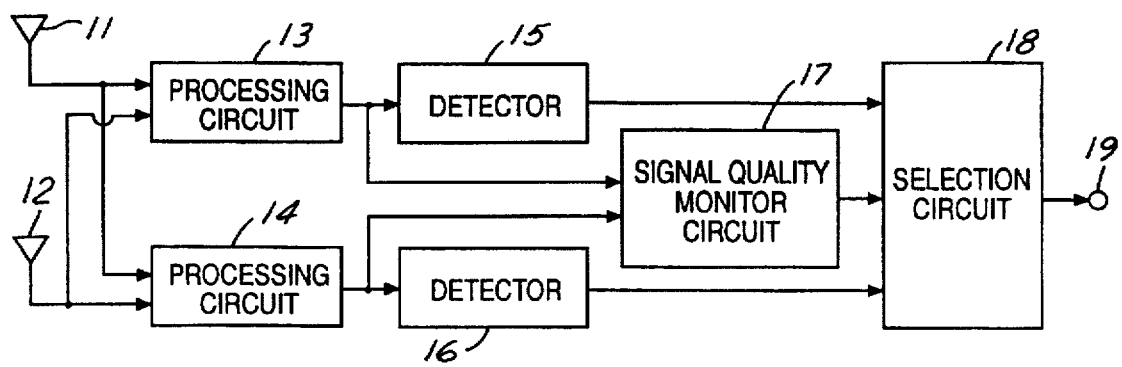
FIG. 1 is a block diagram showing a portion of an adaptive antenna receiver according to the present invention.

Referring to FIG. 1, broadcast RF signals are received by two antennas 11 and 12. Each respective RF signal is input to processing circuit 13 and processing circuit 14. Processing circuits 13 and 14 utilize a constant modulus process to synthesize a corrected signal and a diversity process to generate a diversity signal, respectively. More specifically, processing circuit 13 synthesizes the corrected signal as a weighted combination of the antenna signals as will be discussed below. The corrected signal is coupled to a detector 15 and a signal quality monitor circuit 17. Processing circuit 14 generates a diversity signal corresponding to a selection of a best one of the antenna signals according to a predetermined diversity criterion and provides the diversity signal to a detector 16 and signal quality monitor circuit 17.

Processing circuits 13 and 14 include tunable passband filters (not shown) in order to at least partially isolate the RF broadcast signals for the broadcast station of interest.

The corrected signal from processing circuit 13 and the diversity signal from processing circuit 14 are RF signals which are examined by signal quality monitor circuit 17 to determine the best one of the two according to the measurement of a predetermined quality as discussed below. Signal quality monitor circuit 17 provides a quality detection signal to a selection circuit 18 which accordingly couples the output of either detector 15 or detector 16 to a selection circuit output 19 for further processing by the receiver. Alternatively, one detector could be substituted for detectors 15 and 16 by placing the input of the detector at output terminal 19. In any event, the detector receives an RF signal from a processing circuit, converts it to an intermediate frequency (IF) signal, and detects the audio information encoded in the IF signal. In the case of an FM stereo receiver, a stereo decoder matrix (not shown) would also be included.

Figure 3:
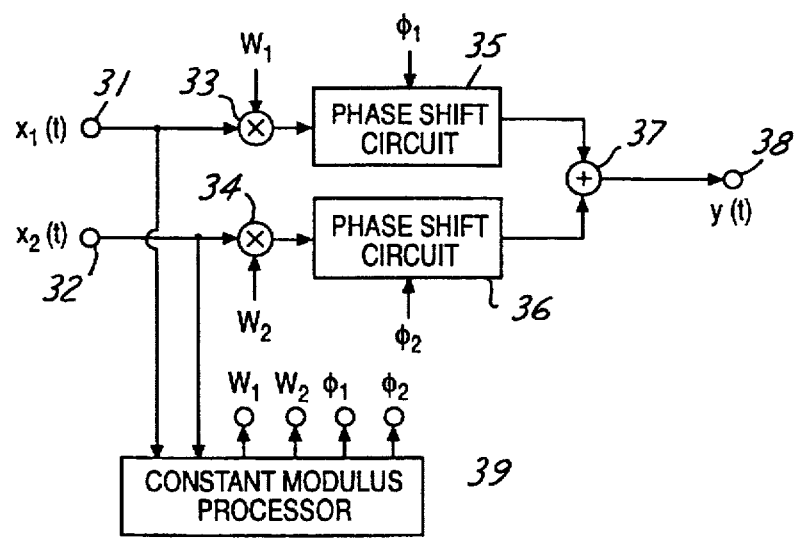
FIG. 3 is a block diagram showing a preferred embodiment of the CMA processing circuit of FIGS. 1 and 2.

Processing circuit 13 is shown in greater detail in FIG. 3. Output signals $x_1(t)$ and $x_2(t)$ from antennas 11 and 12 respectively are coupled to input terminals 31 and 32, respectively. Each input signal is multiplied by a weight factor $W_1$ and $W_2$ in multiplication circuits 33 and 34, respectively. The output signals from multiplication circuits 33 and 34 are phased shifted by respective amounts $\phi_1$ and $\phi_2$ in phase-shift circuits 35 and 36, respectively. The outputs of phase-shift circuits 35 and 36 are added in an addition circuit 37 and the corrected signal y(t) is output at an output terminal 38.

Weight factors $W_1$ and $W_2$ and phase-shift factors $\phi_1$ and $\phi_2$ are determined according to a constant modulus algorithm (CMA) as follows. Signals representing these factors are produced in a constant modulus processor 39 in response to input signals $x_1(t)$ and $x_2(t)$.

For simplification of expressions, the signals are expressed in complex numbers. The actual signal is embodied by the real value of the corresponding complex number. The (complex) output signal of processor 39 is expressed as:

$$y(t)=W_1 e^{j\phi_1} x_1(t)+W_2 e^{j\phi_2} x_2(t)$$

where $x_1(t)$ and $x_2(t)$ are FM signals which are represented as:

$$x_i(t)=A_i(t)e^{j(\omega_c t+\phi_i(t))} \text{ (for } i=1,2)$$

where $A_i$ and $\phi_i(t)$ are amplitude and phase, respectively. Normally, the weight factors and phase shift factors are updated at discrete times, t=nT (where n=0, 1, 2 . . . , and T is the update cycle time). At each update time, the CMA is expressed as:

$$\bar{W}_{ci}(nT+T)=\bar{W}_{ci}(nT)-\mu e(nT)x^*_i(nT) \text{ (for } i=1,2)$$

where $$\bar{W}_{ci}(t)=W_i(t)e^{j\phi_i(t)}$$

$$e(nT) = y(nT) - \frac{y(nT)}{|y(nT)|}$$

μ is a constant value, the asterisk indicates complex conjugate, and vertical bars indicate absolute value. Using these equations, output signal y(KT) of processing circuit 13 is controlled so that its absolute value or amplitude becomes a constant "1". The absolute value of the complex undistorted FM signal is a constant number. However, when multiple echoes of the same FM signal are received with different time lags due to multipath, the absolute value of the received signal is no longer a constant and the so-called beat phenomenon is observed as the absolute value changes over time. If a beat signal is present, the detected signal waveform is distorted. By synthesizing a corrected signal using CMA, the absolute value of the correct signal is controlled to be a constant number, and as a result only one of the various multipath signals is selected and other signals are suppressed. Thus, waveform distortion in the detected signal is greatly reduced or eliminated (provided the received signal strength is sufficient and is not fluctuating rapidly).

Figure 4:
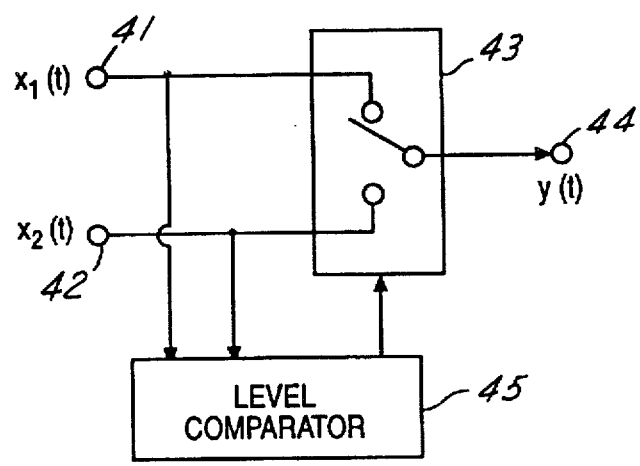
FIG. 4 is a block diagram showing a preferred embodiment of the diversity processing circuit of FIGS. 1 and 2.

Processing circuit 14 of FIG. 1 performs diversity selection as shown in greater detail in FIG. 4. Output signals $x_1(t)$ and $x_2(t)$ from antennas 11 and 12 are coupled to input terminals 41 and 42, respectively. The antenna signals are coupled to a switch 43 and to a level comparator 45. Level comparator 45 determines which antenna signal shows a higher power level or field intensity and sends a control signal to switch 43 to select the antenna signal with the higher level. The selected antenna signal is coupled to output terminal 44 thereby providing a diversity signal y(t). The diversity criterion can be either mean power or average signal voltage or another criterion known in the art.

Figure 5:
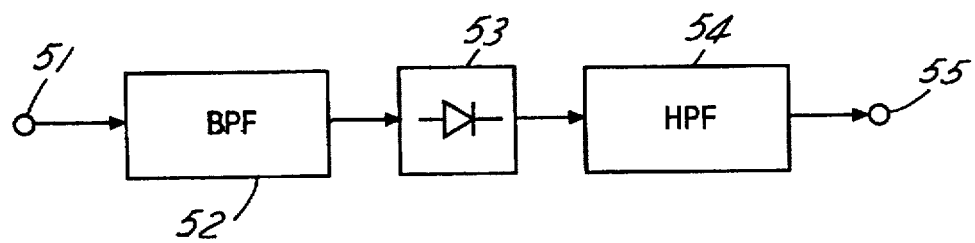
FIG. 5 shows a signal quality monitor circuit for detecting beat components in greater detail.

In the embodiment of FIG. 1, the corrected signal from the CMA processing circuit 13 and the diversity signal from the diversity processing circuit are input directly to signal quality monitor circuit 17. In this embodiment, the predetermined quality which is measured by circuit 17 corresponds to a beat frequency component contained in the corrected signal and the diversity signal, and the mean power of both signals. Details of circuit 17 are shown in greater detail in FIG. 5 wherein the magnitude of the beat frequency component is measured. The circuits in FIG. 5 are duplicated for each of the signals from processing circuits 13 and 14. A signal from a respective processing circuit is input to terminal 15 and applied to a bandpass filter 52 for isolating the beat frequency component. The beat frequency component is amplitude detected in an amplitude detector 53 and the detected output is passed through a highpass filter The detected amplitude changes due to changes in the RF signal magnitude caused by time-variant fading. However, the time varying amplitude of the detected amplitude due to fading is normally below several tens of hertz while beat frequency can be as high as 200 kHz for FM signals. Consequently, the amplitude of the beat frequency component can be obtained by highpass filter 54. The output from highpass filter 54 is coupled to output terminal 55, and it has a low level if waveform distortion is small and a high level if waveform distortion is large.

The circuitry of FIG. 5 is duplicated for each processing circuit and the outputs of the two highpass filters can be compared in selecting the corrected signal or the diversity signal for reproduction as described below.

Returning to FIG. 1, signal quality monitor circuit 17 preferably also measures mean power in the corrected signal and the diversity signal to be used as a second predetermined quality for selecting the best signal. Either mean power or average signal voltage can be measured as is known in the art. Based upon the measured qualities of the corrected signal and the diversity signal, selection circuit 18 implements a suitable criterion for selecting which signal to reproduce in the receiver. For example, the magnitude of the beat components of the two signals are compared and if the difference between them is above a predetermined threshold then the corrected signal is selected, otherwise the diversity signal is selected. Alternatively, if the beat components of both signals are below the predetermined threshold, then the diversity signal is selected. An alternative selection criterion could be that if the mean power of the corrected signal is above a predetermined value and the beat component of the corrected is below another predetermined value, then the corrected signal is selected, otherwise the diversity signal is selected. Alternatively, the selection criterion may be that if the mean level of the diversity signal is above a predetermined level and its beat component is below a predetermined magnitude, then the diversity signal is selected, otherwise the corrected signal is selected. Whatever criterion is used, the invention automatically adapts to the conditions present at the antennas to provide a high quality reception signal.

Figure 2:
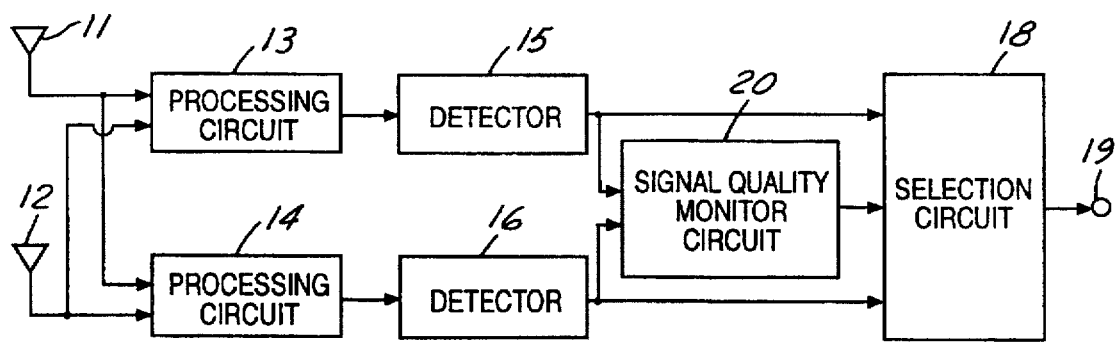
FIG. 2 is a block diagram showing an alternative embodiment of the receiver of FIG. 1.
Figure 6:
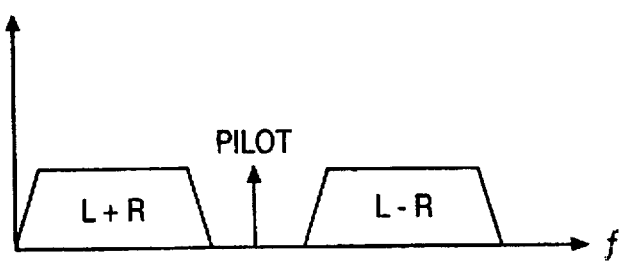
FIG. 6 shows the relationship between a pilot signal and the sum and difference channels of an FM multiplex broadcast.

FIG. 2 shows an alternative embodiment of the invention wherein a signal quality monitor circuit 20 measures a predetermined quality of the detected signals from detectors 15 and 16. Specifically, circuit 20 examines the stereo pilot signal in the detected FM signals for determining the best received signal. FIG. 6 shows the detector output spectrum for a received FM stereo signal. It contains a L+R sum channel, an L-R difference channel, and a pilot signal. The pilot signal is a sinusoidal wave used for demodulating the difference channel. The quality of the received stereo signal can be monitored by detecting pilot signals variations. Since the pilot signal should be sinusoidal, its variation due to multipath distortion can be divided into an amplitude component and a phase component, i.e., an in-phase component and an orthogonal component. Pilot signal quality can be determined by monitoring variation in these components, as described in U.S. Pat. No. 5,408,685, for example. Selection circuit 18 determines which pilot signal is indicated as having the best quality and the detector output having the least variation in the pilot signal is selected by selection circuit 18 and sent to output terminal 19.

The foregoing has provided an adaptive antenna radio receiver with a simple structure which adaptively reduces waveform distortion and fading effects due to multipath in FM broadcast signals.

What is claimed is:

1. A radio receiver adapted to be coupled to at least two spaced-apart receiving antennas generating antenna signals in response to radio broadcast signals, said receiver comprising:

- a correction circuit for receiving said antenna signals and synthesizing a corrected signal as a weighted combination of said antenna signals;
- a diversity selecting circuit for receiving said antenna signals and generating a diversity signal corresponding to a selection of a best one of said antenna signals according to a diversity criterion;
- a signal quality monitor circuit coupled to said correction circuit and said diversity selecting circuit for measuring a predetermined quality of said corrected signal and said diversity signal; and
- a selection circuit for outputting either said corrected signal or said diversity signal in response to said measured predetermined quality.

2. The receiver of claim 1 wherein said correction circuit modifies said antenna signals by multiplying them by respective weights $W_1$ and $W_2$, adjusting their phase by respective amounts $\phi_1$ and $\phi_2$, and adding together the multiplied and phase adjusted signals.

3. The receiver of claim 2 wherein $W_1$, $W_2$, $\phi_1$, and $\phi_2$ are selected to provide a constant modulus for said corrected signal.

4. The receiver of claim 1 wherein said diversity criterion corresponds to a signal level comparison.

5. The receiver of claim 1 wherein said predetermined quality measured by said signal quality monitor circuit includes a level of a beat component of each of said corrected signal and said diversity signal, respectively.

6. The receiver of claim 5 wherein said selection circuit determines a difference between said levels of said beat components and selects said corrected signal if said difference is greater than a predetermined difference, and otherwise selects said diversity signal.

7. The receiver of claim 5 wherein said predetermined quality measured by said signal quality monitor circuit further includes mean power of each of said corrected signal and said diversity signal, respectively.

8. The receiver of claim 7 wherein said selection circuit selects said corrected signal if said level of said beat component of said corrected signal is less than a predetermined level and if said mean power of said corrected signal is greater than a predetermined power, and otherwise selects said diversity signal.

9. The receiver of claim 7 wherein said selection circuit selects said diversity signal if said level of said beat component of said diversity signal is less than a predetermined level and if said mean power of said diversity signal is greater than a predetermined power, and otherwise selects said corrected signal.

10. The receiver of claim 1 wherein said predetermined quality measured by said signal quality monitor circuit includes mean power of each of said corrected signal and said diversity signal, respectively.

11. The receiver of claim 1 further comprising a first detector for detecting said corrected signal and a second detector for detecting said diversity signal, and wherein said predetermined quality corresponds to variations in stereo pilot signals in said detected corrected signal and said detected diversity signal.

* * * * *